UNITED STATES PATENT OFFICE.

A. MÜLLER-JACOBS, OF NEW YORK, N. Y., ASSIGNOR TO CATHARINA MÜLLER-JACOBS AND AUGUST LOOS, BOTH OF SAME PLACE.

COLORED VARNISH.

SPECIFICATION forming part of Letters Patent No. 343,331, dated June 8, 1886.

Application filed February 1, 1886. Serial No. 190,521. (Specimens.)

*To all whom it may concern:*

Be it known that I, ARMAND MÜLLER-JACOBS, of the city, county, and State of New York, have invented certain new and useful Improvements in Coloring-Matters, of which the following is a specification.

The invention relates to the manufacture of coloring compositions in liquid form that are applicable as paints; and the invention consists of a liquid coloring composition composed of the resinate of an alkali, benzine-varnish or oil-varnish, and a coloring matter or dye dissolved in alcohol.

In carrying out my invention a sufficient quantity of caustic alkali is dissolved and mixed at boiling-heat with as much colophony or other resinous gums as the same can absorb. The resinate of the alkali thus obtained is drawn off, strained, and allowed to cool. From ten to thirty parts of the resinate are then mixed with from ninety to seventy parts of benzine-varnish or oil-varnish, to which an alcoholic solution of any suitable coloring matter or dye—such as aniline colors, azo colors or vegetable dyes—is added.

The following ingredients and proportions have given very good results: One hundred parts of colophony or other resin are dissolved in eighty to one hundred parts of wood-alcohol or common ethyl-alcohol by heating to the boiling-point. Twenty-five parts of liquid ammonia of twenty-six per cent. strength, or an equivalent quantity of a caustic alkali or an organic base—such as triemthylamine—are then added, so as to produce an alkali-resinate. This mixture is added to benzine or benzine-varnish, or to alcohol-varnish in the proportion of from twenty to twenty-five per cent. to eighty or seventy-five per cent. of varnish. To each gallon of this varnish are added from two to three ounces of common aniline colors dissolved in alcohol.

The resinate of the alkali forms a vehicle for the benzine or oil varnish dyed with the alcoholic solutions of the coloring matter or dye, the resinate imparting body to the coloring matter or dye and rendering it soluble in the benzine or oil varnish. Paints and varnishes of very bright colors are thus obtained for application in the arts.

Having thus described my invention, I claim as new and desire to secure by Letters Patent—

A liquid coloring composition composed of a resinate of an alkali, benzine-varnish or oil-varnish, and an alcoholic solution of a coloring matter or dye, substantially as set forth.

In testimony that I claim the foregoing as my invention I have signed my name in presence of two subscribing witnesses.

A. MÜLLER-JACOBS.

Witnesses:
PAUL GOEPEL,
MARTIN PETRY.